United States Patent [19]

Lindblom

[11] 4,039,009
[45] Aug. 2, 1977

[54] HYDRAULIC CONTROL SYSTEM FOR A TREE FELLING UNIT

[75] Inventor: Karl Thore Lindblom, Alfta, Sweden
[73] Assignee: Ostbergs Fabriks AB, Alfta, Sweden
[21] Appl. No.: 716,244
[22] Filed: Aug. 20, 1976

Related U.S. Application Data

[63] Continuation-in-part of Ser. No. 582,930, June 2, 1975, abandoned.

[30] Foreign Application Priority Data

June 5, 1974 Sweden .............................. 7407372

[51] Int. Cl.² .......................................... A01G 23/08
[52] U.S. Cl. ................................... 144/34 E; 137/87; 144/3 D
[58] Field of Search ................. 137/87; 144/3 D, 2 Z, 144/34 R, 34 E, 309 AC

[56] References Cited
U.S. PATENT DOCUMENTS 3,826,295  7/1974  Johnson et al. .................... 144/34 E

FOREIGN PATENT DOCUMENTS 366,900  8/1974  Sweden .............................. 144/3 D

*Primary Examiner*—Othell M. Simpson
*Assistant Examiner*—W. D. Bray
*Attorney, Agent, or Firm*—Pierce, Scheffler & Parker

[57] ABSTRACT

At the end of a crane arm on a base vehicle is fixed a frame, the inclination of which is controlled by double-acting hydraulic cylinders, and which supports hydraulically operated grip arms and a cutting unit. The frame is moved with an estimated inclination against a tree, and the grip arms urge the frame into conformance with the actual inclination of the tree, thereby inducing strains in the tree as well as the firmly based crane arm. A valve connecting the inlet and outlet of each hydraulic cylinder is momentarily opened from its hitherto closed position, so that the fluid in the cylinder is forced to equalize under the strains from the biased tree which consequently will be relieved from tension before cutting, otherwise resulting in cracks in the root end of the tree.

3 Claims, 1 Drawing Figure

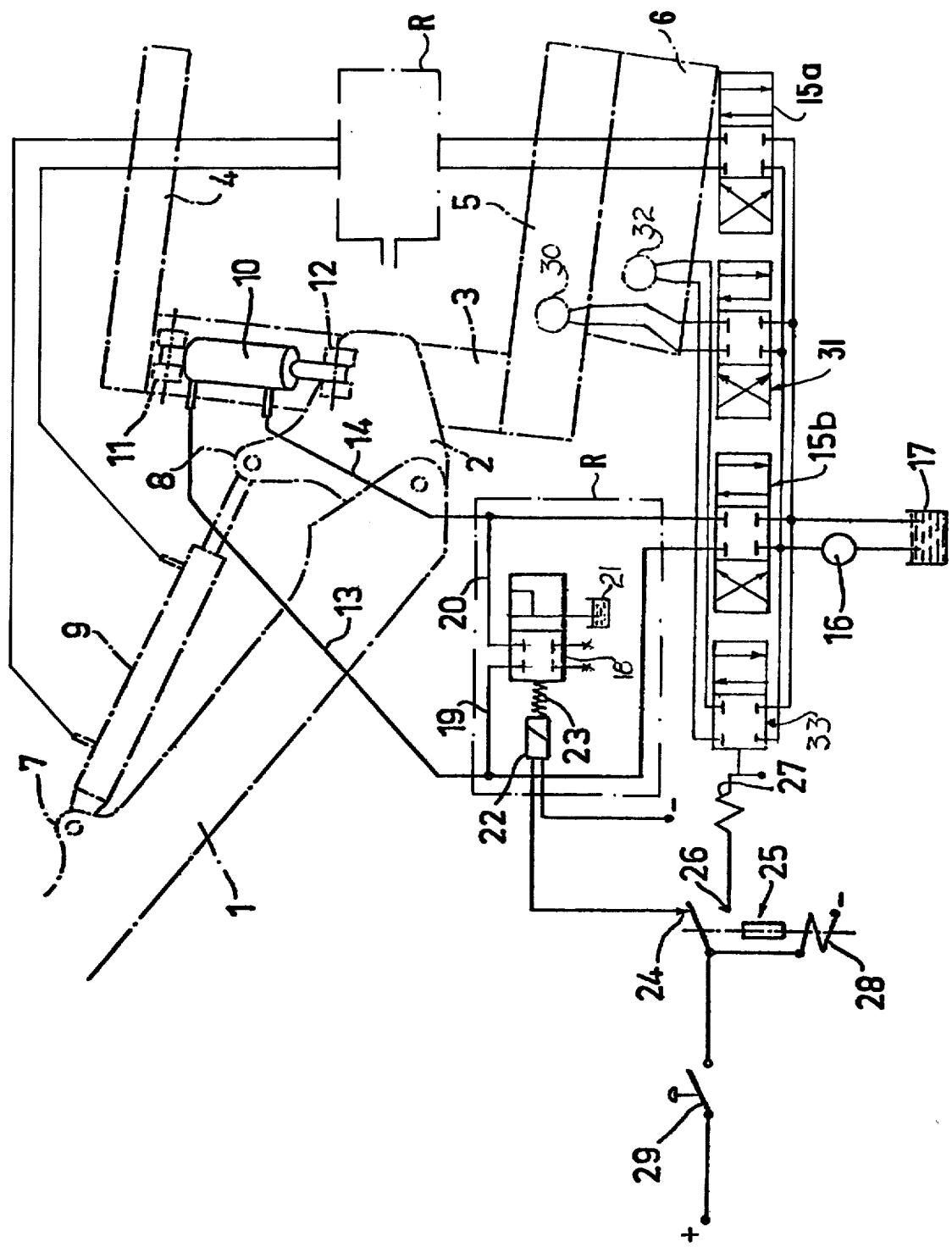

HYDRAULIC CONTROL SYSTEM FOR A TREE FELLING UNIT

This application is a continuation-in-part of application Ser. No. 582,930, filed June 2, 1975, and now abandoned.

The present invention refers to an arrangement with a tree felling unit, the cutting unit and grip arms of which are supported by a frame which is mounted at the end of a crane boom or the like and is tiltable laterally by means of at least a first hydraulic member and tiltable in a forwards and backwards direction by at least a second hydraulic member.

The felling unit described above is used for cutting off tree trunks adjacent the root portion and then transferring the cut-off tree in an upright position for unloading or further processing.

In order to avoid the development of cracks in the root end of the tree during the cutting operation, it is necessary that the engagement of the grip arms before the cutting operation is completely adapted to the tilt of the grasped trunk portion without biasing or inducing tension in the crane boom supporting the felling unit, transmitted to the whole vehicle, which in its turn reacts on the tree. — This has hitherto not been possible, as the crane operator (the driver) from his seat has not been able to decide whether the tree is leaning somewhat towards him or away from him, far less to decide if prominences or other out-growths are present on the back of the tree. The inavoidable consequence is a positioning of the grip arms more or less at a random resulting in a biasing of the tree and thus, in the felling (cutting) operation, a cracking of the root end and thereby a loss of the most valuable wood.

This serious drawback is eliminated by the invention by the fact that between the inlet and outlet conduits of each hydraulic member controlling the inclination of the frame is inserted a control value having a first and a second position for closing and opening the path between the conduits, respectively, there being means for after fixing and biasing actuation of the grip arms around a tree, with said valve still in the closing position but before actuation of the cutting unit, momentarily bringing the valve to its opening position, so that the biasing force of the tree is equalized and thus the frame is relieved from tension and accommodated to the grasped trunk portion before the cutting action.

In the following description of the invention, the dash-and-dot lines indicate a part of a crane boom 1, a generally triangular support member 2, pivoted to the end of the boom and supporting a frame 3 having an upper and a lower pair of grip arms 4 and 5, respectively, and a cutting unit 6 immediately below the lower grip arms unit. The gripping arms are operated in the conventional way by actuating hydraulic cylinders 30 from a hydraulic source 17 and the associated pump 16 via a three-way valve 31, and the cutting unit 6 is operated, likewise in the conventional manner, by actuating hydraulic cylinder 32 via a two-way valve 33. A double-acting hydraulic cylinder 9 acting between an ear 7 on the crane boom and an ear 8 on the support 2 controls the tilt of the frame 23 in a forwards and backwards direction by means of a three-way valve 15a connected to source 17.

For the tilt of the frame in a lateral direction a double-acting hydraulic cylinder 10 is used which is connected between ears 11 on the frame 3 and ears 12 on the support 2, whereby a tilting sideways of the frame is accomplished by means of a three-way valve 15b, likewise connected to source 17.

From the two end terminals of the double-acting hydraulic cylinder 10 inlet and outlet conduits 13 and 14 extend said pump 16 and tank 17, respectively. Similarly, the cylinder 9 is connected to said pump and tank.

The invention resides in the fact that the conventional conduits 13 and 14 (and the corresponding conduits to cylinder 9) can be shunted by means of a special kind of a two-way valve 18 via lines 19 and 20. In a first position (the one shown) the valve maintains the lines 13 and 14 separated from each other (the normal condition), but in its second position it connects said lines with each other via a bridging path as symbolized by the left right in the figure. In the latter position also a vessel 21 is utilized, as described in the following. The valve position is controlled by an electrically operated control unit 22, as of an electric magnet type, against a return force, in this case symbolized by a spring 23. The control unit 22 is supplied from one contact 24 of a switching relay, having the general designation 25, the second contact 26 of which is connected to an operation coil 27 of a magnet valve 33 for actuating the hydraulic cylinder 32 of the cutting unit in the assembly 6.

The electric components described above, inclusive the coil 28 of the time relay 25, is provided with a positive driving potential via a button operated switch 29.

The hydraulic cylinder 9 for controlling the forwards and backwards tilt of the frame 3 has, like the hydraulic cylinder 10, its inlet and outlet interconnectable by a two-way valve, possibly the same as that provided for the hydraulic cylinder 10, and is operated through the same electric circuit 24–29. p The operation of the arrangement described above is as follows:

By coordinating of the hydraulic cylinders 9 and 10 by means of the corresponding three-way valves 15 in the right and a left position, the driver (operator) tries to move the frame 3 with opened grip arm pairs 4 and 5 towards a selected tree. As the next step, the driver switches the three-way valve 15 to its neutral mid position (shown in the figure) thereby providing full supply for the hydraulic cylinders 30 for the upper and lower grip arm pairs 4 and 5. These arm pairs then force the frame 3 to an optimal conformance to the tree, whereby, however, the initially approximate adaption might result in forced strains in the crane arm 1. As this arm of necessity must be extremely rigid as well as its anchoring in the supporting and substantially non-displaceable vehicle, the tree itself would be subjected to the major part of the strains. A cutting-off under these circumstances would result in a cracking of the root end of the tree, as already described.

However, the driver now pushes the button of the switch 29. Hereby the coil 28 of the switching time relay 25 is energized and switches momentaneously its contact to the position shown in the figure, i.e. against the contact 24, so that the control device 22 switches, against the force of the spring 23, the two-way valve 18 from its blocking position shown in the figure to the position symbolically represented to the right in the figure; i.e. the shunt lines 19, 20 and thus the lines 13, 14 are bridged. (The arrangement is similar as shown or common with the raising or lowering hydraulic cylinder 9 as indicated by the dash-and-dot rectangles R). The fluid in the two cylinders 10 and 9 can now be equalized under the action from the biased tree, the excess or deficiency of fluid—due to the different areas of the opposite faces of the piston—is compensated by means of the fluid vessel 21. All this normally takes place during a fraction of a second. The time relay 25 is chosen to have such a time constant that only after the equalization of fluid does it switch over to the contact 25, whereby, on one hand, the supply to the control device 22 is interrupted, and consequently the valve 28 is returned by the spring 25 to the blocking or rest position, and, on the other hand, the actuating coil 27 for the magnet valve 31 for actuation of the hydraulic cylinder 32 and, thus, advancing the cutting member against the now unbiased tree is energized.

As is clear from the above the driver is not burdened with an extra manipulation; like the prior art he just presses a button after forcing the grip arms around a tree.

It is also to be noted that the arrangement of the invention reduces the duration of time for the breaking strains of the crane boom to a small fraction, as compared with prior art.

Various modifications are possible within the scope of the invention, especially by interchanging the described components with equivalent units.

I claim:
1. A tree felling unit comprising
a frame;
grip arms and cutting means supported on said frame;
a crane boom;
said frame being mounted at the end of said crane boom for tilting in two mutually perpendicular vertical planes;
first hydraulic means acting between said boom end and said frame for tilting the same sidewise;
second hydraulic means acting between said boom end and said frame for tilting the same upwards or downwards,
the inlet and outlet of each of the first and second hydraulic means being connected respectively to first and second control valves for energizing the respective hydraulic meand from a common hydraulic source,
the improvement wherein a third control valve interconnects the inlets and outlets of the first and second hydraulic means,
said third control valve having a first and second position for blocking and opening, respectively, the path between said inlets and outlets, said third control valve normally being in its blocking position; and
means for momentarily bringing said third control valve to its opening position after said grip arms have firmly gripped a tree, so that the biasing force of the tree is neutralized over the path between said inlets and outlets, before the cutting operation.

2. A tree felling unit as defined in claim 1, including a switching time relay having two contact positions, in the first of which positions said relay connects an energizing source to a control member for switching said third control valve from its blocking to its opening position against a returning force, and in the second of which positions said relay connects said source to a magnet valve for actuating said cutting means; and a manually operated contact member in series between said source and said relay, so that upon operation of said contact member said path between said inlets and outlets of the first and second hydraulic means is first opened and then blocked after the expiration of the time delay of said relay.

3. A tree felling unit as defined in claim 1, wherein a vessel is connected to the piston rod side of said third control valve for compensating the difference in effective area of the two opposite faces of the piston.

* * * * *